US012607062B2

(12) United States Patent
Chua

(10) Patent No.: US 12,607,062 B2
(45) Date of Patent: Apr. 21, 2026

(54) WAND FOR A BLIND ASSEMBLY

(71) Applicant: Rollease Acmeda, Inc., Stamford, CT (US)

(72) Inventor: Shih Yang Chua, Sunshine West (AU)

(73) Assignee: Rollease Acmeda, Inc., Stamford, CT (US)

(*) Notice: Subject to any disclaimer, the term of this patent is extended or adjusted under 35 U.S.C. 154(b) by 1050 days.

(21) Appl. No.: 16/311,270

(22) PCT Filed: Jun. 6, 2017

(86) PCT No.: PCT/AU2017/050558

§ 371 (c)(1),
(2) Date: Dec. 19, 2018

(87) PCT Pub. No.: WO2017/219071

PCT Pub. Date: Dec. 28, 2017

(65) Prior Publication Data

US 2019/0195014 A1 Jun. 27, 2019

(30) Foreign Application Priority Data

Jun. 21, 2016 (AU) ................................ 2016902418

(51) Int. Cl.
*E06B 9/78* (2006.01)
*E06B 9/326* (2006.01)
*E06B 9/42* (2006.01)

(52) U.S. Cl.
CPC ................ *E06B 9/78* (2013.01); *E06B 9/326* (2013.01); *E06B 9/42* (2013.01); *E06B 2009/785* (2013.01)

(58) Field of Classification Search
CPC . E06B 9/326; E06B 9/78; E06B 9/322; E06B 9/42; E06B 2009/785
See application file for complete search history.

(56) References Cited

U.S. PATENT DOCUMENTS 5,125,447 A * 6/1992 Suggs .................... E06B 9/322 160/320
5,232,038 A 8/1993 Buxbaum
(Continued)

FOREIGN PATENT DOCUMENTS

EP 2573311 3/2013
GB 2560052 A * 8/2018 ............ E06B 9/326
(Continued)

*Primary Examiner* — Daniel P Cahn
*Assistant Examiner* — Matthew R. Shepherd
(74) *Attorney, Agent, or Firm* — HAYNES AND BOONE, LLP

(57) ABSTRACT

A wand for a blind assembly comprising (a) an elongated member, (b) a rotatable member located at or adjacent one end thereof, (c) guide member located at or adjacent another end thereof; and (d) a cord having a loop, wherein the loop passes from a position remote from the rotating member, engages the rotating member, passes about the guide member and returns to the remote position after reengagement of the rotating member, wherein the loop adjacent to or within the elongated member is retained between the rotating member and the guide to restrict movement of the loop perpendicularly of the elongated member, and wherein the loop remote from the rotating member is adapted to engage and rotate a drive member of a blind assembly.

8 Claims, 5 Drawing Sheets

(56) References Cited

U.S. PATENT DOCUMENTS 5,465,775 A * 11/1995 Biba ........................ E06B 9/306 74/502
5,513,687 A * 5/1996 Tuzmen .................. E06B 9/326 160/178.1 R
5,595,232 A * 1/1997 Benthin .................. E06B 9/361 160/320
5,671,793 A * 9/1997 Lee ......................... E06B 9/322 160/168.1 R
5,709,258 A * 1/1998 Coccoluto ............... E06B 9/326 16/442
5,752,558 A * 5/1998 Lin ......................... E06B 9/326 160/320
5,797,441 A * 8/1998 Benthin .................. E06B 9/361 160/173 V
5,845,696 A * 12/1998 Chou ........................ E06B 9/36 160/321
6,196,293 B1 * 3/2001 Lee ......................... E06B 9/303 160/168.1 V
6,463,987 B1 * 10/2002 Nevins ...................... E06B 9/62 160/173 R
6,516,860 B1 * 2/2003 Weaver ..................... E06B 9/30 160/168.1 R
6,792,999 B2 * 9/2004 Cross ........................ A47H 3/08 474/138
7,779,886 B2 * 8/2010 Ganzi ..................... E06B 9/322 160/173 R
7,931,069 B2 * 4/2011 Cannaverde ............ E06B 9/322 474/171
8,286,686 B2 * 10/2012 Cannaverde ............ E06B 9/326 160/320
8,544,525 B2 * 10/2013 Zhu ........................... E06B 9/56 160/321
8,763,675 B2 * 7/2014 Zhu ......................... E06B 9/324 160/321
8,950,463 B2 * 2/2015 Vestal ..................... E06B 9/322 160/173 R
9,016,347 B2 * 4/2015 Lin ......................... E06B 9/326 160/321
9,038,696 B2 * 5/2015 Lava .......................... E06B 9/68 160/321
10,208,535 B2 * 2/2019 Marocco ................. E06B 9/326
10,968,692 B2 * 4/2021 Marocco ................. E06B 9/326
11,105,149 B2 * 8/2021 Marocco ................... E06B 9/78
11,142,945 B2 * 10/2021 Marocco ................... F16H 7/18
11,236,547 B2 * 2/2022 Graham .................. E06B 9/326
2003/0111188 A1 6/2003 Cross et al.
2011/0094065 A1 4/2011 Frederick
2011/0185540 A1 8/2011 Nevins
2012/0017399 A1 1/2012 Huang
2012/0097343 A1 * 4/2012 O'Hair .................... E06B 9/307 160/368.1
2013/0091968 A1 * 4/2013 Lin ........................... F16H 7/08 74/89.21
2018/0238109 A1 * 8/2018 Kanargelidis ........... E06B 9/326
2019/0093427 A1 * 3/2019 Marocco ................. E06B 9/322
2019/0195014 A1 * 6/2019 Chua .......................... E06B 9/78
2019/0264501 A1 * 8/2019 Marocco ................... E06B 9/42
2019/0390514 A1 * 12/2019 Marocco ................... F16H 7/18
2023/0057794 A1 * 2/2023 Marocco ................... E06B 9/78

FOREIGN PATENT DOCUMENTS

WO WO2012088219 6/2012
WO WO-2015185728 A1 * 12/2015 ............. E06B 9/322

* cited by examiner

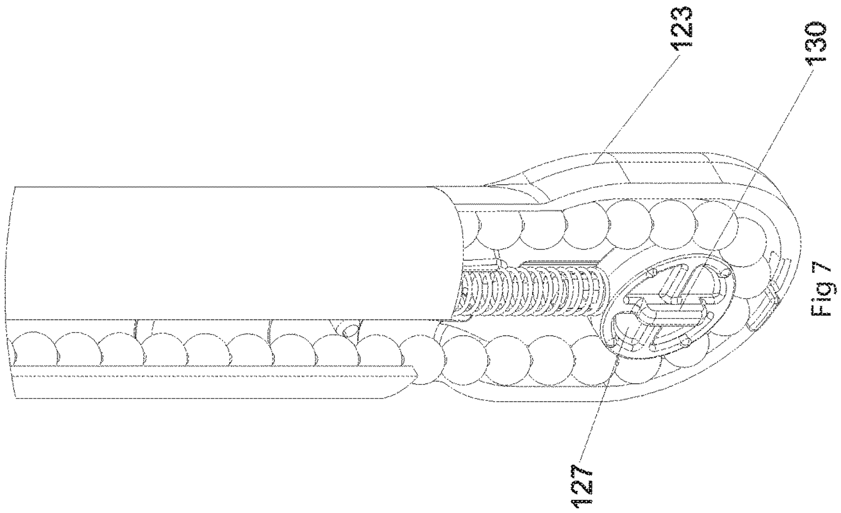
Fig 7
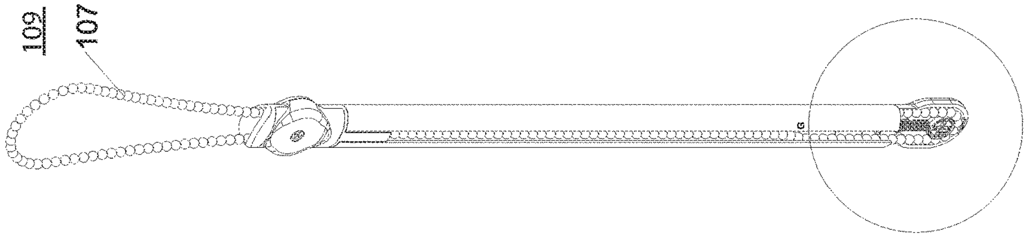
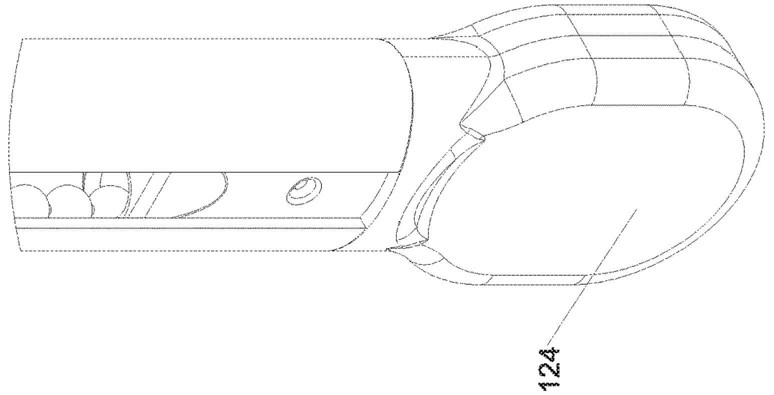
Fig 6
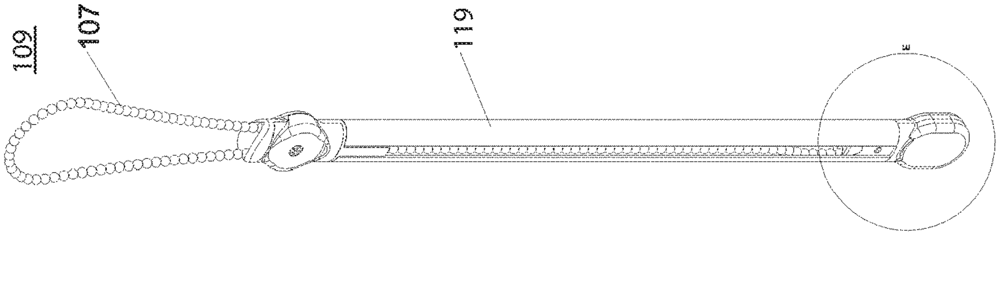

WAND FOR A BLIND ASSEMBLY

FIELD

The present invention relates generally to a wand for use with a blind assembly. More particularly the invention relates to a wand which may be retrofitted to an existing blind assembly.

BACKGROUND

In this specification where a document, act or item of knowledge is referred to or discussed, this reference is not an admission that the document, act or item of knowledge or any combination thereof was at the priority date, publicly available, known to the public, part of the common general knowledge; or known to be relevant to an attempt to solve any problem with which this specification is concerned.

A blind assembly has a blind component (or fitting) that is rotatable to, for example, extend and retract a window covering such as a window blind. Such assemblies typically have a drive mechanism that is rotatable about a spindle, and engages a cord (for example a beaded cord or chain). Operation of the cord causes the drive mechanism to rotate about the spindle. For example, the cord may be pulled in one direction to rotate the fitting in a blind extending direction and the cord may be pulled in an opposite direction to rotate the fitting in a blind retraction direction.

In cord operated blind assemblies, the cord is usually in the form of a loop which hangs approximately vertically from the assembly to allow easy operation by the user pulling on the cord. However, the problem with a hanging cord loop is that it presents a safety risk especially to small child. In particular, the loop may become entangled around the neck of a child and present a strangulation risk.

A number of solutions have been proposed to mitigate against this risk. In particular, devices known as wands have been proposed and sold which comprise a device to substantially enclose a cord loop. This minimizes the risks of the loop being accessed to form an expanded loop which may pose the child safety risk.

A typical wand of this type is described in WO201113402. As described this wand includes a rigid elongated member which has a pair of wheels, one at either end and around which the cord is looped. The relative sizes of the cord loop and the elongated member is selected such that movement of the loop perpendicular to the longitudinal axis of the elongated member is limited. One wheel at one end of the elongated member is rigidly attached to constitute the drive mechanism for the spindle.

Accordingly such wands require integral rigid fixing to the blind assembly. As such these wands are part of the original blind assembly upon installation or if attempted to be fit retrospectively require the blind assembly to be disassembled and reinstalled. This adds to the cost of the blind assembly and its installation.

The present invention seeks to provide a simple means to incorporate a wand type safety device into an existing installed blind assembly though of course, if desired, it can be incorporated in the initial blind assembly.

SUMMARY

According to a first aspect of the invention, there is provided a wand for a blind assembly comprising:

(a) an elongated member, (b) a rotatable member located at or adjacent one end thereof.

(c) a guide member located at or adjacent another end thereof; and (d) a cord having a loop, wherein the loop passes from a position remote from the rotating member, engages the rotating member, passes about the guide member and returns to the remote position after reengagement of the rotating member, wherein the loop adjacent to or within the elongated member is retained between the rotating member and the guide to restrict movement of the loop perpendicularly of the elongated member, and wherein the loop remote from the rotating member is adapted to engage and rotate a drive member of a blind assembly.

Typically, the rotatable member is a wheel, mounted for rotation in or on the elongated member. The wheel will usually have a plurality of positions to selectively retain the cord in position. So if the cord is beaded, at least one of the beads will be located in a depression at one of the wheel positions.

Typically, the elongated member is substantially tubular and the cord is at least partially located within the elongated member.

Typically, the guide member comprises a guide pathway to receive at least part of the cord and a biasing member to bias the guide pathway in a direction away from the rotatable member to cause the cord passing therebetween to be under tension. The guide pathway may be defined by a surface of a cylindrical member which is urged in the desired direction by a mounted spring device.

This lack of perpendicular slack in the cord loop improves safety by not permitting an undesirable loop to form which may be a hazard to children.

If the cord is beaded, rotation of the rotatable member will cause the beads and depressions in the rotatable member to engage, such that the beaded coil on one side of the rotatable member will be pulled in the direction of the biasing member, and the coil on the other side of the rotatable member will equally be pulled away from the direction of the biasing member. This feature also improves the safety of the assembly as the amount of cord in the guide member and the biasing member is kept consistent.

Additionally this arrangement may exhibit less operational nose due to the cord loop adjacent the elongated body being under tension.

Unlike conventional wands, the wand of the invention may be both installed when installing a new blind assembly or also be a retrofit to an existing blind system. This is possible by reason of not requiring an end of the elongated member to directly engage the drive member of the blind assembly. This means that it is possible to retrofit the wand on an existing blind assembly without having to replace the winder mechanism.

This means no special attachment device needs to be present. With the wand of the current invention, the cord loop outside the elongated member can be engaged about the drive member simply and easily. The chain wheel in the rotatable member limits the length of cord loop inside or adjacent the elongated member and restricts the movement of the cord perpendicular to the elongated member.

A detailed description of one or more embodiments of the invention is provided below, along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents.

For the purpose of example, numerous specific details are set forth in the following description in order to provide a thorough understanding of the present invention. The present invention may be practiced according to the claims without some or all of these specific details. For the purposes of clarity, technical material that is known in the technical fields related to the invention has not been described in detail so that the present invention is not unnecessarily obscured.

For the purposes of providing a clear description of the present invention, terms such as “up”, “down”, “left” and “right” are used in the below descriptions. This terminology will be understood to be for illustrative purposes only, and does not limit the scope of the present invention.

BRIEF DESCRIPTION OF THE DRAWINGS

Various embodiments/aspects of the invention will now be described with reference to the following drawings in which.

FIG. 6 is a perspective view and partial view E (circled) of the wand according to FIG. 2.

FIG. 7 is a perspective view and partial view G (circled) of the wand according to FIG. 2 in a partially disassembled form.

DETAILED DESCRIPTION

Figure 1:
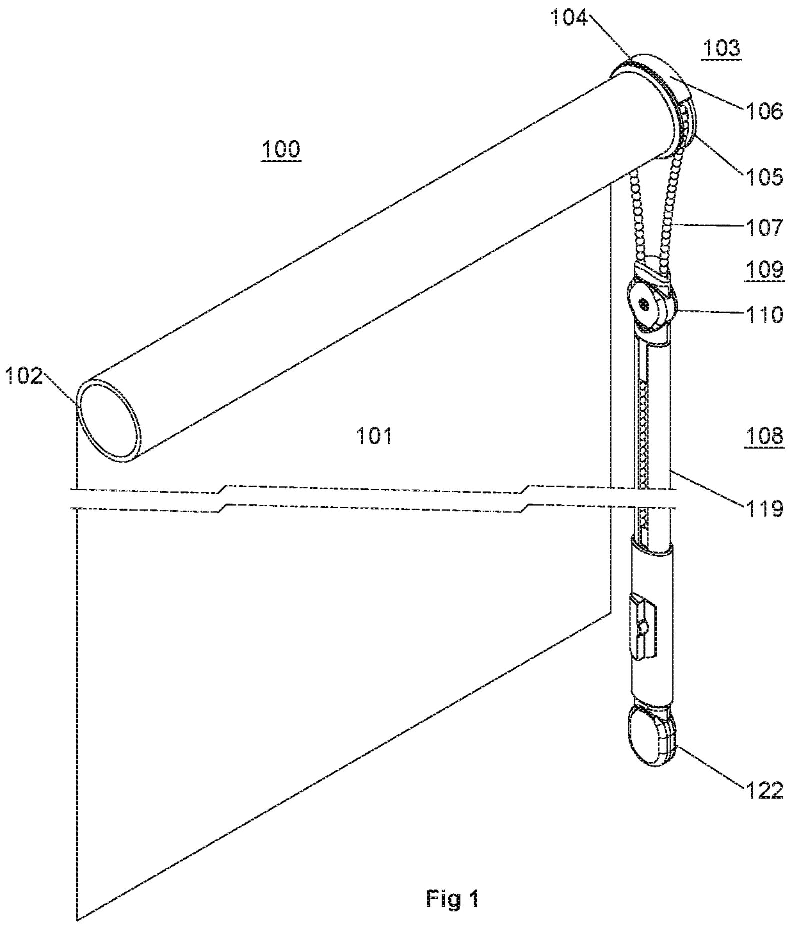
FIG. 1 depicts a perspective view of a blind assembly with a wand according to one aspect of the invention in the installed position.

FIG. 1 depicts a blind assembly 100 comprising a blind 101 which is rolled onto a cylinder 102. Rotation of the cylinder 102 in different directions cause the blind 101 to either retract or extend. The cylinder 102 is engaged on a spindle (not shown) which is located at the right end of the cylinder 102. The drive member 103 extends from the spindle with a flange 104, a rotatable wheel 105 and a cover 106. A beaded cord 107 is located about wheel 105. Pulling on portion of the cord 107 causes the wheel 105 to rotate the drive member 103. This cause cylinder 102 to rotate and the blind to extend or retract.

Figure 3:
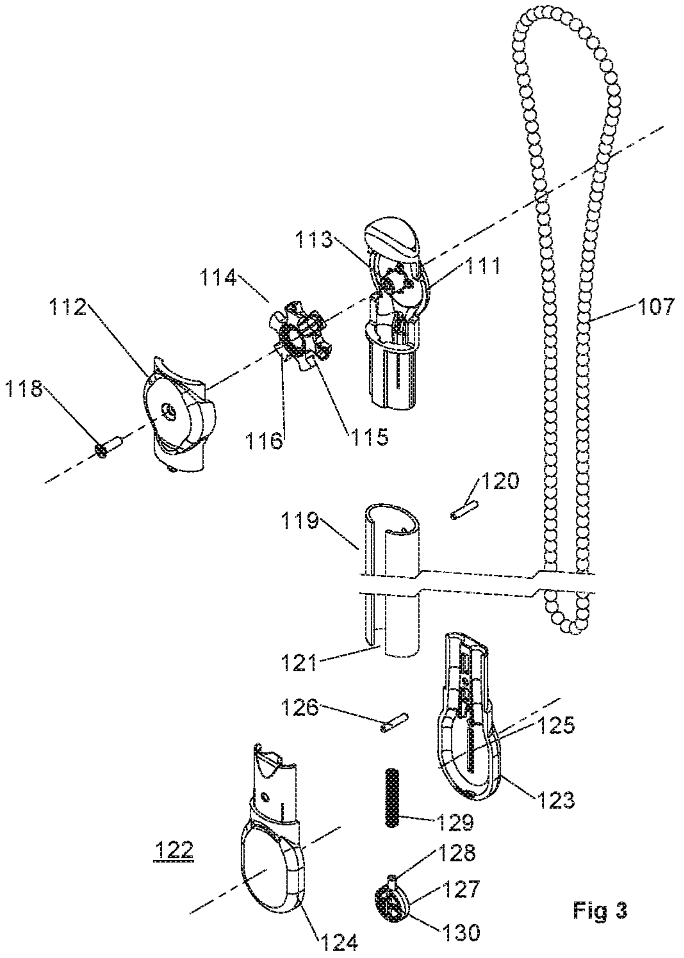
FIG. 3 depicts a perspective assembly view of the wand of FIG. 2.
Figure 5:
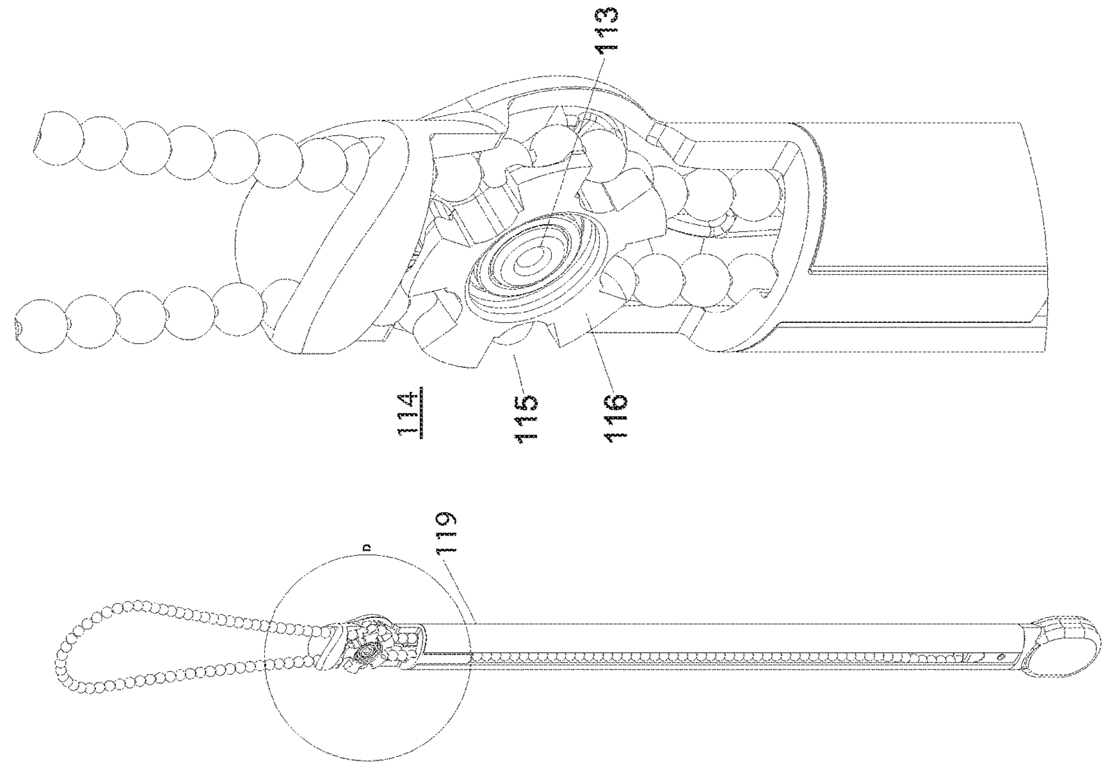
FIG. 5 is a perspective view and partial view D (circled) of the wand according to FIG. 2 in a partially disassembled form.
Figure 4:
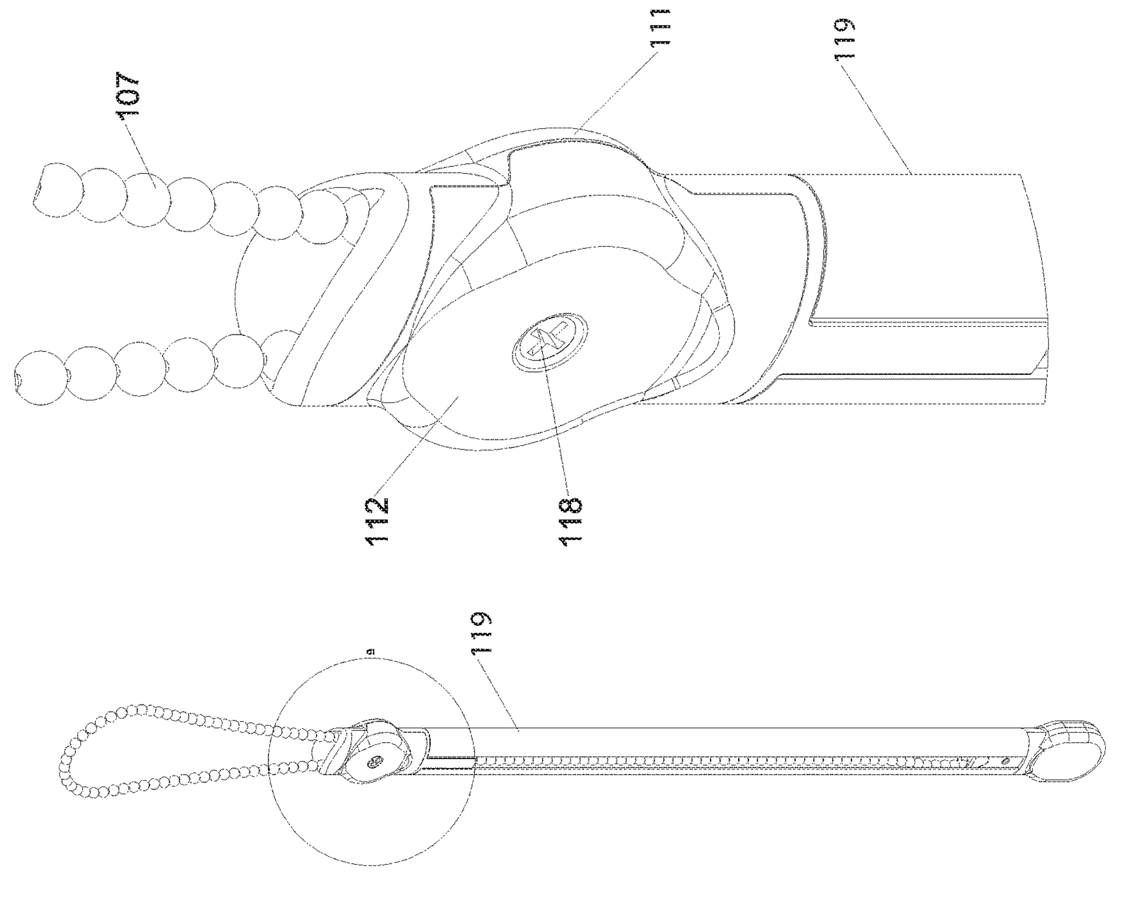
FIG. 4 is a perspective view and partial view B (circled) of the wand according to FIG. 2.

The wand 108 has a beaded cord loop portion 109 which is located about wheel 105. The other end of this loop portion 109 enters a rotatable member 110. As shown in FIGS. 3, 4 and 5, the rotatable member 110 comprises a housing of two parts 111 and 112. Part housing 111 includes an axle mount 113. Axle mount 113 receives the wheel 114 and permits the wheel 114 to rotate freely thereabout. Wheel 114 (as more clearly shown in FIG. 5) has a number of regularly spaced radial openings 115 and arms 116 which together are able to retain beads 117. The other housing part 112 covers the wheel 114 and may be fastened to the axle mount 113 with screw 118.

Figure 2:
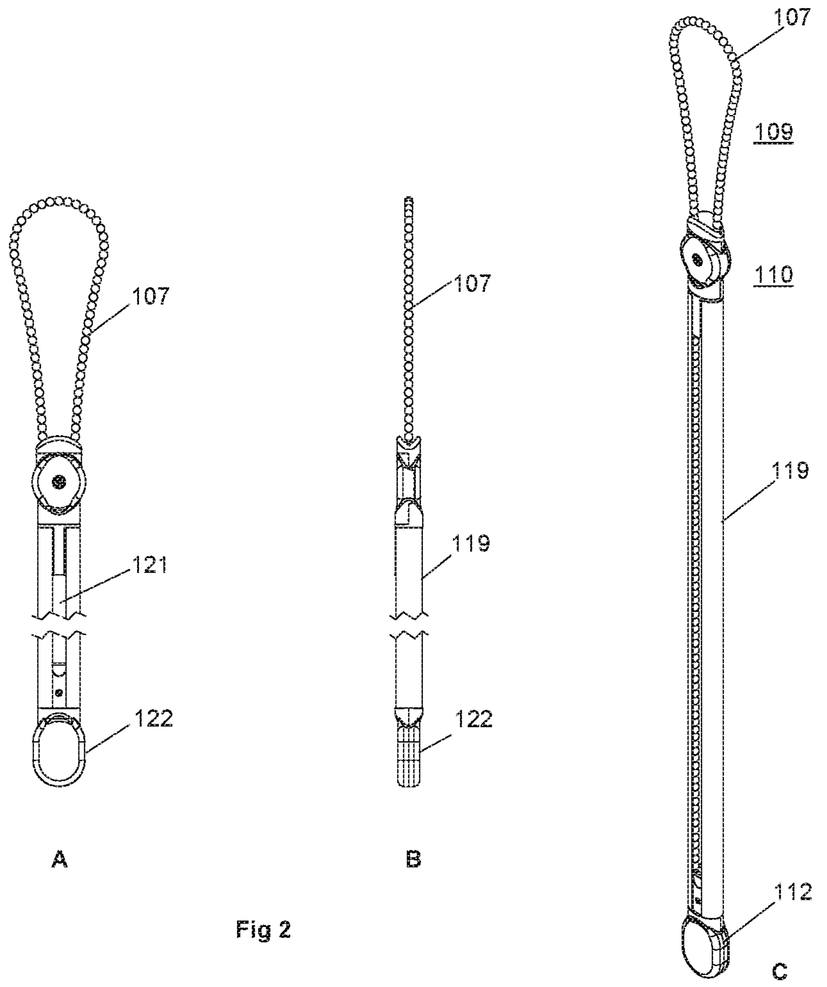
FIG. 2 depicts front, side and perspective views (A, B and C) of a wand accordingly to an aspect of the invention.

Wheel 114 is located in one end of elongated tubular member 119 and fixed in position by screw 120. Elongated member 119 may be of any suitable length sufficient to enclose the beaded cord 107 over a sufficient length to assist prevention of the formation of a potentially dangerous loop. It is unnecessary that elongated member 119 be completely enclosed as shown in FIG. 2 and may have a longitudinal opening 121.

At the other end of elongated tubular member 119 is a guide member 122. As more particularly shown in FIGS. 2, 6 and 7 the guide member 122 comprises a housing of two parts 123 and 124. Part housings 123 and 124 includes matching linear slots 125. Located in these slots 125 when the part housings 123 and 124 are connected (via pin 126) is a cylinder member 127. Cylinder member 127 has corresponding arms 130 which when assembled located for sliding movement in linear slots 125.

Cylinder member 127 has a pin projection 128 extending in the axial direction of elongated tubular member 119. A spring 129 envelops the pin projection 128 at one end. The other end of the spring 129 sits in the parts housing 123 and 124.

As shown in FIGS. 5 and 7, cord 107 extends from the wheel 114 down both internal surfaces of the elongated tubular member 119 and about part of the circumferential surface of cylinder 127. Cylinder member 127 under the influence of spring 129 is urged away from the rotatable member 110 and places the cord 107 in tension between the rotatable member 110 and the cylindrical member 127.

Pulling on cord 107 in a blind-extending direction causes the wheel 114 of the rotatable member 110 to rotate. The rotation of wheel 114 engages openings 115 and arms 116 with beads 117 and therefore cord 107 on one side of the wheel 114 to pull that portion of the cord 107 in the direction of cylindrical member 127. The rotation of wheel 114 also causes the openings 115 and arms 116 on the opposite side of the wheel 114 to take up beads 117 and therefore the cord 107 from the direction of the cylindrical member 127.

In this arrangement, wheel 114 restricts the movement of the cord 107 in a direction perpendicular to the elongated tube 119. Therefore the risk of a loop of the cord 107 forming which would prevent a safety hazard to a child is minimized.

Modifications and improvements to the invention will be readily apparent to those skilled in the art. Such modifications and improvements are intended to be within the scope of this invention.

The word ‘comprising’ and forms of the word ‘comprising’ as used in this description and in the claims does not limit the invention claimed to exclude any variants or additions.

The invention claimed is:

1. A wand for a blind assembly having a drive member, the wand comprising:

(a) an elongate member, (b) a rotatable member spaced from the blind assembly and located at or adjacent one end of the elongate member, (c) a guide member located at or adjacent another end of the elongate member, the guide member including a biasing member, and (d) a cord configured to rotate the drive member, wherein the cord forms a loop which passes from a position remote from the rotatable member, engages the rotatable member, engages and passes about the guide member and returns to the remote position after reengagement of the rotatable member, wherein the loop has a first segment between the rotatable member and the guide member, which is disposed within the wand and retained under tension between the rotatable member and the guide member by the biasing member to restrict movement of the first segment of the loop within the wand perpendicularly of the elongate member, the first segment being retained under tension without the wand being installed on the blind assembly;

wherein the loop has a second segment remote from the rotatable member, the second segment of the loop remote from the rotatable member for rotating the drive member when the wand is installed on the blind assembly, the second segment being free of the tension from the biasing member to facilitate the second segment of the loop being placed about the drive member;

wherein the rotatable member engages, in one plane, a first portion of the cord and a second portion of the cord to translate the first portion in a first direction while simultaneously translating the second portion in a second direction that is opposite of the first direction;

wherein the biasing member is configured to retain the first segment under tension without the wand being installed on the blind assembly and to retain the first segment under tension when the wand is installed on the blind assembly;

wherein the guide member comprises two housing parts which are configured to be joined together, and a cylinder member configured to be retained within the two housing parts when joined, the loop being configured to pass about and engage with the cylinder member;

wherein the cylinder member provides a guide pathway for the loop and the biasing member is configured to bias the guide pathway in a direction away from the rotatable member to retain the cord under tension between the rotatable member and guide member;

wherein the cylinder member has a pin projection extending in an axial direction of the elongate member;

wherein the guide member further comprises a pin extending perpendicular to the axial direction and between the two housing parts;

wherein one end of the biasing member is configured to be positioned over the pin projection and another end is positioned against the pin;

wherein the biasing member is configured to act between the pin and the cylinder member to bias the cylinder member away from the rotatable member, and wherein a position of the rotatable member is configured to be stationary along the axial direction of the elongate member relative to the pin when the wand is installed on the blind assembly.

2. The wand of claim 1 wherein the rotatable member is a wheel, mounted for rotation in or on the elongate member.

3. The wand of claim 2 wherein the wheel has a plurality of positions to selectively retain the cord.

4. The wand of claim 3 wherein the cord is beaded and at least one of the beads is located at a position of said plurality of positions with said position comprising a depression.

5. The wand of claim 2 wherein the elongate member is tubular and the cord is at least partially located within the elongate member.

6. The wand of claim 3 wherein the elongate member is tubular and the cord is at least partially located within the elongate member.

7. The wand of claim 3 wherein the plurality of positions to selectively retain the cord is provided by a plurality of regularly spaced radial openings and arms on the wheel which are together configured to retain the cord.

8. The wand of claim 1 wherein at least one of the housing parts has an elongate slot into which a corresponding arm of the cylinder member is configured to be located to provide for sliding movement of the cylinder member with respect to the housing parts.

* * * * *